Feb. 24, 1970 A. A. SCHNEIDER 3,497,635

TAPE RECORDER WITH AUDIBLE END OF TAPE INDICATING MEANS

Filed Nov. 21, 1966

Inventor:-
Arthur A. Schneider,
By Brown, Jackson, Boettcher & Dienner Attys.

United States Patent Office 3,497,635
Patented Feb. 24, 1970

3,497,635

TAPE RECORDER WITH AUDIBLE END OF TAPE INDICATING MEANS

Arthur A. Schneider, Stevensville, Mich., assignor to V-M Corporation, Benton-Harbor, Mich., a corporation of Michigan Filed Nov. 21, 1966, Ser. No. 595,907
Int. Cl. G11b *5/02*
U.S. Cl. 179—100.2 5 Claims

ABSTRACT OF THE DISCLOSURE

Tape recorder in which an electrically conductive leader on the tape end attached to the supply reel bridges two spaced electrically conductive tape guides when the tape is fully unwound from the supply reel so as to connect the speaker into the output of the amplifier whereby feed-back between the speaker and the microphone produces a prolonged audible sound signaling the end of the tape.

The present invention relates to devices which are useful for recording and also reproducing sound on magnetic tape and particularly relates to the provision of such devices with novel means of signaling to an operator who is using the device to record that the end of the tape has been reached.

It is well known that on many occasions when a tape recorder is being used to record dictation or other sound, the operator's attention will be focused on an area other than that of the tape moving past the recording head. Consequently, the end of the tape can be and often is reached before the operator becomes aware that the recorder is no longer operatively recording his dictation or other sound.

It is therefore a principal object of the present invention to provide a tape recorder with an audible warning signal which is energized when the tape reaches its end.

Another object of the invention is to provide a tape recorder with means which will detect the end of a tape as it moves across the transducer head and which will sound an alarm to attract the user's attention so that he is not required to visually reinspect the tape supply during a recording sequence.

A feature of the invention is that the circuitry of the recorder is itself relied upon to produce the signal, rather than adding an auxiliary signal and operating circuit thereto.

Thus, in accordance with the invention, switch means are provided in the amplifier circuit of the recorder which are adapted to be operated by the tape itself in such manner that when the end of the tape is reached, the speaker which is normally disconnected during the recording mode is temporarily connected back into the output of the amplifier so that feed back between the speaker and microphone produces an audible tone in the speaker which signals the operator that the end of tape has been reached. Although the invention therefore has its greatest utility in portable tape recorders where both the microphone and speaker are housed in the unit also containing the amplifier, it is also useful with recorders having an external microphone where the gain of the amplifier and the proximity of the microphone will permit acoustic feed back between the speaker and microphone to generate a sufficiently strong audio signal to attract the operator's attention.

In the accomplishment thereof, the means which guide the tape across the recording head are electrically connected to opposite sides of the switch which the operator opens to take the speaker out of the circuit when he sets the device for recording. Because the portion of the tape on which the head records is non-conductive, a leader can be attached to the tape or an end portion of the tape can itself be made electrically conductive so that by spanning the two tape guides it will complete an electrical circuit thereacross which will short out the opened speaker switch, thereby placing the speaker back in the circuit and with the resultant feed back producing an audible signal in the speaker.

Thus an important feature of the invention is the provision of spaced guide means which are traversed by the tape in its travel past the head when the apparatus is set for recording and which spaced means constitute a switch to be closed by the tape for energizing a signal.

A second and companion feature of the invention is the provision of the terminal end of the tape with an electrically conductive portion or leader which is of a length sufficient to bridge across the electrical conductive tape guide means so as to close said switch and thereby complete the electrical circuit which initiates an alarm or signal to advise the operator that the tape has reached its end.

A further but also important feature of the invention is that the leader is also secured to the supply reel so that the tape and its leader does not merely run off the supply reel, but is stretched or tightened across the two tape guides so as to produce a good electrical contact and thereby assure completion of the alarm sounding circuit.

Other and further objects, as well as features and advantages of the present invention will at once be apparent when considering the following description of illustrated embodiments thereof given for purpose of disclosure and taken in conjunction with the accompanying drawings in which like character references designate like parts throughout the several views. Referring therefore to the drawings.

Figure 1:
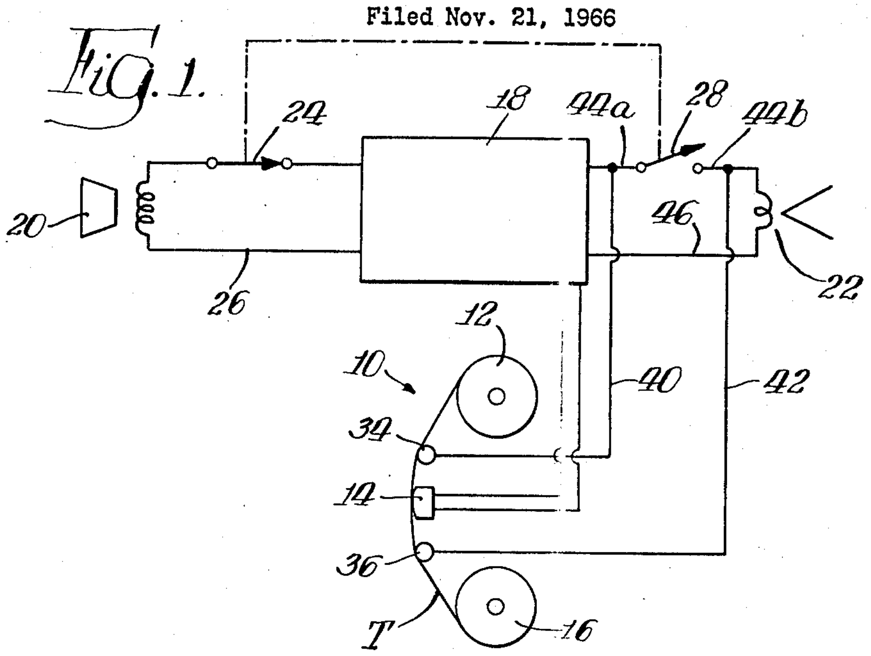
FIGURE 1 illustrates in schematic form a first embodiment of the invention utilized in a tape recording-reproducing device having a conventional tape deck.
Figure 2:
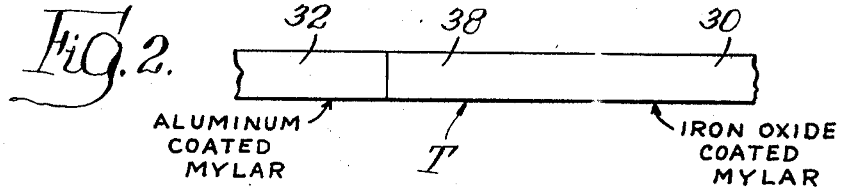
FIGURE 2 illustrates a fragment of tape constructed in accordance with the invention.

Referring therefore now to the several views wherein like parts are identified by like reference numerals, and first to FIGURES 1 and 2, the embodiment of the invention there illustrated comprises a magnetic type tape recorder of conventional construction identified generally at 10, and which it will be understood is adapted to be set for recording sound on magnetic recording tape and thereafter can also be set for playing back sound which has been previously recorded on the tape. As illustrated, such a device includes a supply reel 12 from which tape T is fed across a play-record transducer head 14 onto a take-up reel 16. Head 14 is connected into an amplifier circuit indicated generally at 18 having a microphone 20 and a speaker 22 which are selectively connected therewith. At 24 is a switch which completes a circuit 26 connecting microphone 20 to the amplifier circuit 18. At 28 is a switch which completes a circuit for connecting speaker 22 to the amplifying circuit 18. The thus broadly defined electrical circuit and components for reproducing or recording sound on tape T are of conventional construction and since specific details thereof play no part in the present invention will not be more specifically described. It should be further understood, however, that switches 24 and 28 are so coupled that when one is closed the other is opened. The circuit is thus designed so that upon closing switch 24 and opening switch 28 head 14 is adapted to record sound on tape T which is picked up by microphone 20. Conversely when switch 28 is closed and switch 24 is open, speaker 22 is adapated to emit sound previously recorded on the tape T as the same is scanned by head 14.

Tape T comprises a main non-conductive section 30 which is adapted for recording sound thereon by means of a transducer head in the well known manner. For example section 30 may comprise a flexible strip of polyester resin such as Mylar or other suitable plastic coated on one side with a thin non-conductive layer of iron oxide or other magnetic material in a vinyl resin binder. In one commercial form thereof, so-called magnetic tape has a thickness of about .002 inch, a width of about .125 inch and a length determined by the diameter of reels 12, 14 and playing and/or recording time required; for example it may be as long as 2400 feet or longer.

In accordance with the present invention the trailing end of section 30 is spliced or otherwise secured to a length of electrically conductive leader 32, the opposite end of which leader 32 is fastened to the supply reel 12. In those instances where the tape is intended to be recorded upon when fed in either direction a similar length of electrically conductive leader 32 will also be used to secure the opposite end of the tape section 30 to take-up reel 16. Leader or leaders 32 will preferably also comprise a coated strip of polyester resin such as Mylar but distinguish from section 30 by reason that their coating comprises a thickness of conductive metal, for example aluminum having a resistive value of less than 2.0 ohms per inch. Leader 32 will have the same width and thickness as coated section 30 and a comparable flexibility so that it may be readily coiled with the tape about reels 12 and 16.

The invention also contemplates that tape guides 34 and 36 shown located on opposite sides of head 14 to guide the tape across head 14 are made electrically conductive and connected to opposite sides of switch 28, as by lines 40 and 42. Thus in FIGURE 1, line 40 is shown as electrically connecting tape guide 34 into portion 44*a* of line 44 containing switch 28 and on the amplifier side of said switch 28. Line 42 electrically connects the other tape guide 36 to portion 44*b* of line 44 on the speaker side of switch 28. It will be understood that the tape guides 34 and 36 may comprise electrically conductive metal bodies; they may also comprise die cast plastic members plated with an electrically conductive metal such as chromium. Although tape guides 34 and 36 are illustrated as disposed on opposite sides of head 14 it will be understood that for purposes of the invention as hereinafter described, they may both be located on the supply reel side of the head, and less advantageously on the take-up reel side of head 14.

Referring therefore now to FIGURE 1, it will be seen that with switch 24 closed and switch 28 opened, as illustrated, speaker 22 is dead and microphone 20 is electrically connected to the amplifier 18. The recorder 10 therefore is set for recording. This may be obtained, as by turning take-up reel 16 to pull tape T across the head 14 whereupon sound picked up by microphone 20 will be converted into electrical energy by 18 which actuates head 14 to record on tape section 30. Recording will continue until a sufficient amount of tape section 30 has been wound on the take-up reel 16 to carry leader 32 beyond head 14 and it bridges both guides 36 and 34. At that moment, leader 32, being electrically conductive, will complete a circuit between guides 34 and 36 bypassing switch 28 so that the speaker 22 is also connected to the amplifier. As illustrated in FIGURE 1, this circuit is represented by line 44*a* connected to one side of the amplifier 18, lead 40, tape guide 34, the bridging piece of conductive leader 32, tape guide 36, lead 42, line portion 44*b*, speaker 22 and line 46 of the circuit 30 which connect to the other side of amplifier 18. Because leader 32 is also connected to reel 12, as the take-up reel 16 continues to turn, the conductive leader portion does not separate from the reel 12, but is effectively stretched or tightened across guides 34, 36 so that good electrical contacts therebetween are established. Such bridging of leader 32 across tape guides 34, 36 effectively connects speaker 22 back into the amplifying circuit 18 but without disconnecting microphone 20 therefrom, whereupon feed back of the amplifier output from the speaker 22 to the microphone 20 produces an audible tone in the speaker which will signal the operator that tape section 30 has moved beyond head 14 and wherefore sound is no longer being recorded on the tape. By reason that guides 34, 36 are disposed on opposite sides of head 14, this signal will not be given until section 30 has moved completely past head 14. By locating both guides 34, 36 between the take-up reel 12 and reel 16 the signal will be initiated just ahead of the end of tape section 30 moving across head 14.

Of course, when the tape recorder 10 is set for play back, since switch 28 is now closed and switch 24 open, the bridging of tape leader across guides 34, 36 will have no effect. However, when the recorder is set for play back the end of the tape is signaled by the ceasing of sound from the speaker 22.

It will be further appreciated that leader 32 will be required only at the trailing end of tape section 30 and which is ordinarily connected to supply reel 12. If it is contemplated that the tape will be also used to record when run in reverse, a second leader 32 will also be utilized to connect section 32 to take-up reel 16. It will be appreciated, however, when the direction of the tape is reversed the fact that the leader bridges tape guides 34, 36 at the start of the tape travel is of little consequence because the only effect of bridging is to produce the audible sound resulting from feed back as discussed above and as soon as reel 12, now designated the take-up reel is started the leader will be immediately carried beyond the head 14 so that if any audible sound is produced it is only momentarily and immediately ceases as the leader moves past head 14 and is rewound on reel 12. In this connection it will be appreciated that leader 32 can be of any desired length and in accordance with the duration of signal required. When the leader is also attached to the supply reel, not only does the pull of the take-up reel or other drive on the tape effect a tensioning of the leader 32 across the guides to assure a good electrical contact but the signal will continue to emit from the speaker 22 until turned off. Alternatively, conductive leader 32 might be connected to supply reel 12 by a non-conductive leader in which event the length of conductive leader 32 will determine the duration of the signal.

Figure 3:
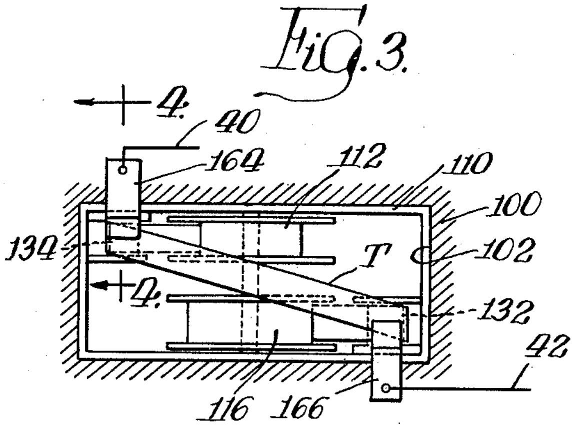
FIGURE 3 illustrates the invention embodied in a tape recording-reproducing device employing a removable tape carrying cartridge.
Figure 4:
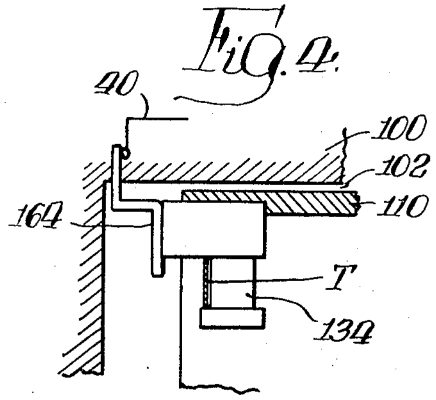
FIGURE 4 is a sectional view taken along lines 4—4 of said FIGURE 3.

It will be further appreciated that with suitable modification the invention may be also adapted for use with a portable magnetic tape recorder of the type utilizing a removable tape cartridge. Such an embodiment of the invention is illustrated in FIGURE 3, wherein a cartridge represented at 110 is adapted for removable positionment into cavity 102 of a portable tape recorder 100. As illustrated in said FIGURE 3, cartridge 110 includes a supply reel 112 rotatably supported over a take-up reel 116. From the former, tape T is fed about a first tape guide 134 located at the upper left hand corner of the cartridge from which it moves diagonally across the open end of the cartridge to a second tape guide 136 located in the lower right hand corner and from thence onto take-up reel 116, the diagonal portion of the tape between the two guides being located against the play-record head (not shown) when the cartridge 110 is properly located in cavity 102 with its open end facing inwardly. Tape T may be driven either by means of a capstan acting on the tape or the take-up reel 116 may be suitably clutched to the prime mover of the recorder when the cartridge is properly positioned into the cavity. The type of drive means employed to move the tape however, plays no part in the present invention and will therefore not be further described.

It will be understood that tape T in cartridge 110 also includes a main record-play section 30 as described in connection with the embodiment of FIGURE 1 and will have one of its two ends connected by an electrically conductive leader 32 to take-up reel 116 and its other by an electrically conductive leader 32 to supply reel 112. Electrically conductive leaders 32 and section 30 of the tape will be of the construction as described above. Tape guides 134 and 136 are also electrically conductive and preferably chrome plated as were guides 34, 36 in the first described embodiment. The play-recording circuit of portable recorder 100 will be understood to also comprise an amplifier, microphone and speaker as described and illustrated in connection with FIGURE 1 and is therefore not reproduced in FIGURE 2 except for leads 40 and 42 by which tape guides 134 and 136 are necessarily electrically connected to line 44 of said circuit on the opposite sides of switch 28.

Because cartridge 110 is made removable from recorder 100, leads 40 and 42 connect to respective ones of spring contacts 164 and 166 provided in the cavity 102 and permanently fastened to the housing at appropriately spaced locations so as to establish electrical contact with respective portions of guides 134 and 136 when cartridge 110 is properly positioned in cavity 102. The operation of this second embodiment is therefore exactly as has been described above in connection with FIGURE 1. As the end of the recording section 30 of the tape is reached, a leader 32 bridges the tape guides 134, 136 to complete a circuit which by-passes switch 28 whereupon speaker 22 is connected to the output of amplifier 18, and with the result that feed back from the speaker to the microphone produces an audible tone in the speaker to warn the operator that the end of the tape has been reached.

From the above description it will be apparent that all of the recited objects, advantages and features of the invention have been demonstrated as obtainable in a highly practical manner. Furthermore, although the invention has been described with respect to certain specific embodiments thereof, it will be understood that various other modificaions of my invention are intended to be encompassed within its true spirit and scope.

Having described my invention, I claim:

1. A tape recorder for use with non-conductive magnetic tape having a trailing leader of electrically conductive material, said recorder including a head, means for feeding the tape across said head to record sound thereon, an operative electrical circuit including an amplifier having an internal microphone connected across the amplifier input connector means and a speaker in disconnected relation to the amplifier output.

2. A tape recorder as claimed in claim 1 also including a supply of non-conductive recording tape adapted to be guided by said guide means past the recorder head, said tape continuing to engage the tape guide means as it is moved along the guide path and including an electrically conductive member attached to the trailing end thereof, said conductive member being of a length to bridge said guide means whereby to complete the electrical circuit to energize the signal means and indicate the end of the tape.

3. In a tape recorder as claimed in claim 1 wherein the tape is disposed within a tape cartridge removably inserted into the recorder, the tape cartridge containing said two spaced tape guide means, and the recorder has spring contacts electrically connected to the signal means, said contacts being positioned so as to be operatively abutted by said guide means when the cartridge is inserted into the recorder so as to be connected to the signal means thereby.

4. In a tape recorder having a microphone, a speaker and an amplifier circuit which connects the transducer head to the microphone, the combination of a tape including a non-conductive length on which the head magnetically records sound picked up by the microphone and a pair of spaced guides which are engaged by the tape in its travel past the head, said tape also including a conductive portion of a length to bridge the two guides, and the two guides being electrically connected to the amplifier circuit and to the speaker such that when the conductive portion bridges the two guides the speaker is connected into the circuit and feedback from the speaker to the microphone produces an audible tone in the speaker.

5. A tape recorder as claimed in claim 2, wherein the terminal ends of the tape are wound respectively on a rotatable supply reel and a driven take-up reel, the terminal end of the tape wound on the supply reel including the length of conductive leader, and said end of the tape being fixed to the supply reel such that the supply reel resists the pull on the tape exerted by the driven take-up reel upon completion of unwinding the tape from the supply reel, to stretch or tighten the leader portion as it bridges the two tape guide means to establish a good electrical contact between the conductive portion and the guide means and prolong emission of the signal.

References Cited

UNITED STATES PATENTS

| | | | |
|---|---|---|---|
| 2,952,746 | 9/1960 | Sampson | 179—100.2 |
| 3,377,437 | 4/1968 | Probst | 179—100.2 |

BERNARD KONICK, Primary Examiner

J. RUSSELL GOUDEAU, Assistant Examiner

PO-1050
(5/69)

UNITED STATES PATENT OFFICE

CERTIFICATE OF CORRECTION

Patent No. 3,497,635 Dated February 24, 1970

Inventor(s) Arthur A. Schneider

It is certified that error appears in the above-identified patent and that said Letters Patent are hereby corrected as shown below:

Column 5, line 53, after "output" insert

-- ; and switch means in said circuit including at least two tape guide means carried in spaced relation by the recorder for defining a guide path therebetween, said guide means being electrically conductive and bridgeable therebetween by a conductor leader portion of the tape to complete said operative electrical circuit and connect the speaker to the amplifier output whereby when said operative electrical circuit is completed, feed-back from the speaker to the internal microphone produces an audible signal in the speaker--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents